United States Patent [19]

Sorenson

[11] Patent Number: 5,409,602
[45] Date of Patent: Apr. 25, 1995

[54] STRAINER FOR GUTTER DOWNSPOUTS

[76] Inventor: Gordon U. Sorenson, 14934 SE. Wanda Dr., Milwaukie, Oreg. 97267

[21] Appl. No.: 202,165

[22] Filed: Feb. 25, 1994

[51] Int. Cl.6 .................. E04D 13/00; E04D 13/06; B01D 35/02
[52] U.S. Cl. ................................... 210/162; 210/163; 210/456; 210/474; 210/482; 52/12
[58] Field of Search .............. 210/162, 163, 456, 474, 210/482; 52/12

[56] References Cited

U.S. PATENT DOCUMENTS

| | | |
|---|---|---|
| 669,495 | 3/1901 | Babcock . |
| 901,526 | 10/1908 | Dixon . |
| 1,011,669 | 12/1911 | Temme . |
| 1,862,134 | 6/1932 | Boosey . |
| 2,120,395 | 6/1938 | Dean . |
| 2,640,593 | 6/1953 | Korb . |
| 2,807,368 | 9/1957 | Blau . |
| 2,988,226 | 6/1961 | Carpbell . |
| 3,121,684 | 2/1964 | Bugbird . |
| 3,357,561 | 12/1967 | Schmid . |
| 3,469,698 | 9/1969 | Blendermann . |
| 3,935,878 | 2/1976 | Ostevik . |
| 4,107,929 | 8/1978 | Ebeling . |
| 4,112,691 | 9/1978 | Ebeling . |
| 4,230,346 | 10/1980 | Gobel . |
| 4,285,812 | 8/1981 | Stoltz . |
| 4,607,465 | 8/1986 | Hopkins . |
| 4,615,153 | 10/1986 | Carey . |
| 4,905,427 | 3/1990 | McPhalen . |
| 4,949,514 | 8/1990 | Weller . |
| 5,044,581 | 9/1991 | Dressler . |
| 5,056,276 | 10/1991 | Nielson . |
| 5,072,551 | 12/1991 | Manoogian . |
| 5,095,666 | 3/1992 | Williams, Jr. . |
| 5,103,601 | 4/1992 | Hunt . |
| 5,107,635 | 4/1992 | Carpenter . |
| 5,109,640 | 5/1992 | Creson . |
| 5,181,350 | 1/1993 | Meckstroth . |
| 5,242,591 | 9/1993 | Beechert . |
| 5,271,191 | 12/1993 | Vahamaki . |
| 5,271,192 | 12/1993 | Nothum, Sr. . |

FOREIGN PATENT DOCUMENTS

| | | |
|---|---|---|
| 275202 | 3/1964 | Australia . |
| 575358 | 5/1959 | Canada . |
| 35134 | 3/1966 | Finland . |
| 302511 | 7/1968 | Sweden . |
| 936687 | 9/1963 | United Kingdom . |

OTHER PUBLICATIONS

Dalzell, J. Ralph, "New Type Gutter Guard Ends Clogging for Years", Washington Post, Jul. 22, 1961, p. B3.

*Primary Examiner*—Thomas M. Lithgow
*Attorney, Agent, or Firm*—Eugene M. Eckelman

[57] ABSTRACT

An elongated body member is of inverted U-shape and is capable of seating in a gutter over a downspout opening. The body member has cross slots and bottom edge notches in an arrangement that efficiently stops leaves and debris but that allows water to drain through. Further, the body member has tapered end portions terminating in rounded tip ends that also are engaged by leaves and debris for efficient straining. The construction of the body member allows the sides to be squeezed together for fitting into eave troughs and the like during installation.

3 Claims, 1 Drawing Sheet

STRAINER FOR GUTTER DOWNSPOUTS

BACKGROUND OF THE INVENTION

This invention relates to new and useful improvements in strainers for gutter downspouts.

Most buildings require gutters and/or some type of downspout to carry rain water off the roof. This requires an inlet to the downspout. Such inlets are rather small and frequently become plugged. The average residence has eave troughs which are hung on the outer edge of the eaves and are associated with downspouts that drain the water away. The inlet to the downspout is readily plugged by leaves or other debris and requires frequent cleaning. Such cleaning may be necessary at a moment's notice to avoid water damage to the residence or grounds. Screen is often employed to cover the inlet but such is not satisfactory because a small number of leaves for example can plug the screen. Thus, plugging of downspouts is a continuing problem.

SUMMARY OF THE INVENTION

A primary object of the invention is to provide a strainer for gutter downspouts that amounts to a substantial improvement over existing devices.

It is another object of the invention to provide a strainer of the type described that has a novel structure to hold back a substantial amount of leaves or other debris and at the same time to allow rain water to drain therethrough without plugging.

In carrying out these objects, the strainer includes a body member of inverted U-shape in cross section arranged to cover a downspout opening. The body member has laterally extending slots spaced throughout its length including at tapered end portions thereof. The tapered end portions terminate in rounded tips. The body member has longitudinal bottom edges that are notched to provide additional water draining openings. The invention will be better understood and additional objects and advantages will become apparent from the following description taken in connection with the accompanying drawings.

DETAILED DESCRIPTION OF A PREFERRED EMBODIMENT

Figure 1:
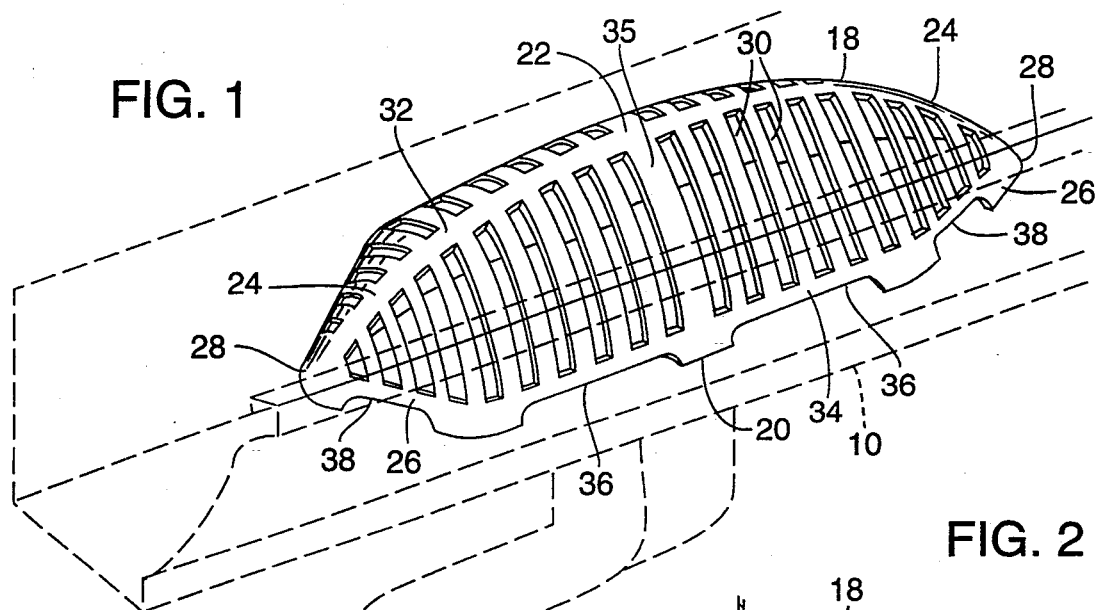
FIG. 1 is a perspective view of the present strainer for downspout openings embodying the invention, a gutter portion and downspout with which the present strainer can be used being shown in broken lines.
Figure 2:
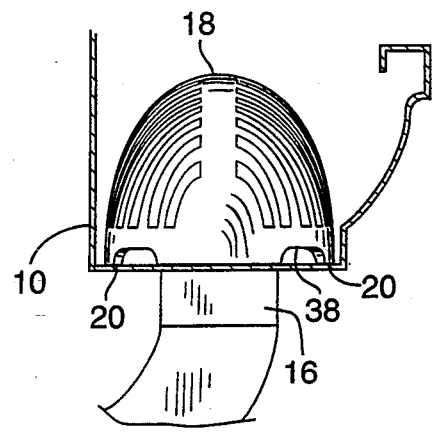
FIG. 2 is an end view of the strainer and gutter.
Figure 5:
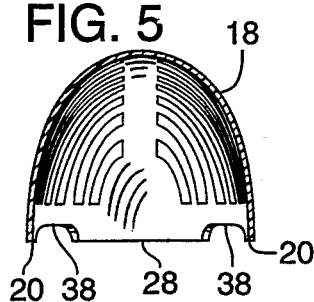
FIG. 5 is a sectional view taken on the line 5—5 of FIG. 4.
Figure 3:
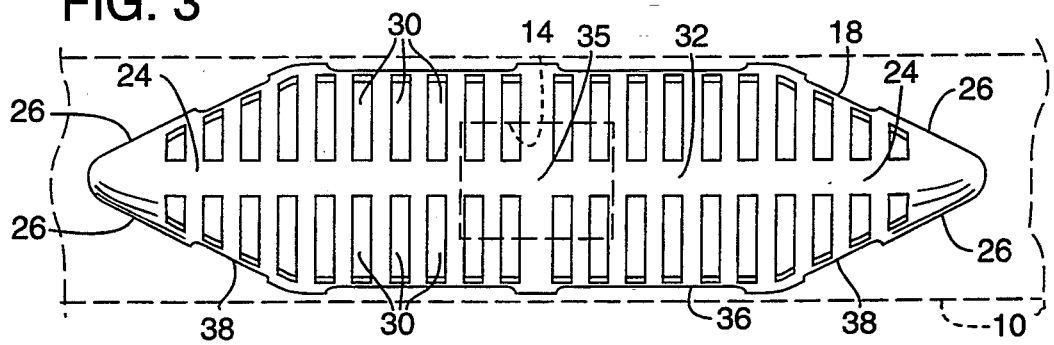
FIG. 3 is a top view of the strainer.

With particular reference to the drawings, the numeral 10 designates a gutter comprising a conventional eave trough. The numeral 12 designates a downspout. Eave troughs include an opening 14, FIG. 3, and a depending tubular portion 16, FIG. 2, at the opening for connection to the downspout. While the present invention is illustrated for use in connection with a conventional eave trough, it is to be understood that it can be used with substantially any type of gutter that is associated with a drain outlet wherein it is desired to sift leaves or other debris.

Figure 4:
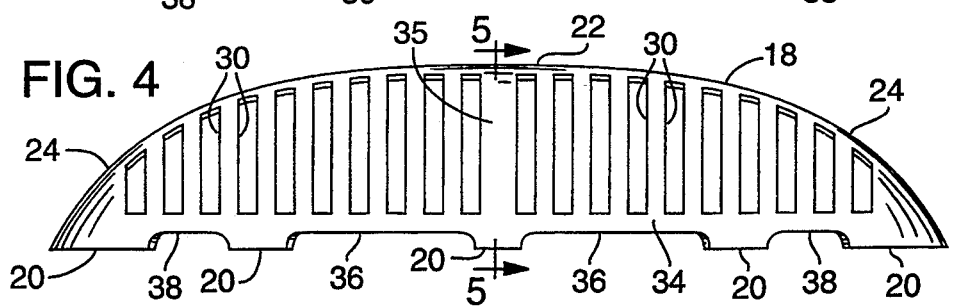
FIG. 4 is a sidle view.

The present invention comprises an elongated body member 18 having an inverted U-shape in its cross section. It is symmetrical in its U-shape and has opposite bottom edges 20 on which the device seats on the bottom of the eave trough. The body member longitudinally comprises a central straight or only slightly convexed portion 22, FIG. 4, leading into more sharply convexed portions 24 at the ends. In plan, FIG. 3, the body member has end tapers 26 forming reduced tip ends 28. The tip ends 28 are rounded to prevent leaves or debris from hanging up on them.

The body member 18 has a plurality of lateral or cross slots 30 which extend at right angles to the longitudinal axis of the body member. Two opposite rows of the slots are provided, the slots in the rows being spaced from each other selectively to provide a strong ribbed structure and one that drains a substantial amount of water therethrough. Each slot extends between a point just short of the longitudinal center, to form a central longitudinal frame portion 32, and a point just short of the bottom edges 20, to form side longitudinal frame portions 34. Also, the two slots 35 next adjacent the longitudinal center are spaced apart a greater amount than the other slots to form a reinforcing central transverse frame portion 35.

Each bottom edge 20 has a pair of longitudinal notches 36 in the expanse between the tapered ends and a shortened notch 38 at the reduced tapered ends. The slots 30 and notches 36, 38 are provided in number and size to provide good straining of leaves and debris. For example, the slots 30 are preferably about one-fourth inch wide and the notches 36, 38 are about one-fourth inch high.

In the use of the present strainer, it is inserted directly over the downspout inlet 14 in the inverted position as shown in the drawings with the bottom edges 20 resting on the bottom surface of the eave trough. Due to the inverted U-shaped configuration of the body member, as well as by its tapered ends, the sides thereof can be squeezed together at the bottom if necessary to clear any protruding edges of the eave trough during installation. The device is preferably made of plastic or thin metal to provide the desired flexibility.

The combination of slots 30 and notches 36 and 38 provide efficient straining of the water flow into the down-spout and at the same time stop leaves and other debris in a manner that prolongs complete plugging. That is, leaves floating in the eave trough are guided by the inverted U-shape of the body member and the end tapers along the side of the top ridge 32 such that a substantial part of the upper slots 30 remain open for draining. This particular shape prevents the leaves from jamming against the ends of the body member so that a dam will not build in this area. Also, leaves that may pile up on the sides of the body member do not close off the bottom notches 36 and 38 but rather will stack above the bottom of the eave trough between sides of the body member 18 and inner surfaces of the eave trough. The narrowed notches 38 at the ends allow very small leaves and debris to flow through but not large leaves or debris that could plug the downspout. Thus, according to the invention, an inexpensive moldable device is provided that due to its shape and structure provides most efficient protection from plugging of downspouts and at the same time allows efficient draining even when contacted by a large quantity of leaves or debris.

It is to be understood that the form of my invention herein shown and described is to be taken as a preferred example of the same and that various changes in the shaper size and arrangement of parts may be resorted to without departing from the spirit of my invention, or the scope of the subjoined claims.

I claim:

1. A strainer for downspout openings of gutters comprising:
    an elongated body member of inverted U-shape in cross section,
    said body member having opposite ends tapered to a rounded tip and also having opposite bottom edges for seating engagement of the body member in a gutter,
    said ends and bottom edges defining an area capable of covering a downspout opening in a gutter,
    and water draining openings in said U-shaped body member.

2. The strainer of claim 1 wherein said bottom edges of said body member include notches forming additional water draining openings, the notches in the bottom edges at said tapered ends having less length than the notches along the sides.

3. A strainer for downspout openings of gutters comprising:
    an elongated body member of inverted U-shape in cross section,
    said body member having opposite ends tapered to a rounded tip and also having opposite bottom edges for seating engagement of the body member in a gutter,
    said ends and bottom edges defining an area capable of covering a downspout opening in a gutter,
    said body member including a longitudinal central top frame portion and longitudinal frame portions at said bottom edges,
    lateral rib means connecting said central frame portion and said bottom frame portions, said rib means being spaced from each other throughout the length of said body portion and forming water draining openings in said U-shaped body portion,
    said bottom edges of said body member including notches forming additional water draining openings.

* * * * *